Nov. 26, 1929.   N. E. WEBB   1,737,530
WATER POWER DEVICE
Filed Sept. 28, 1927   3 Sheets-Sheet 1

INVENTOR.
Norman E.Webb,
By
Geo. P. Kimmel
ATTORNEY.

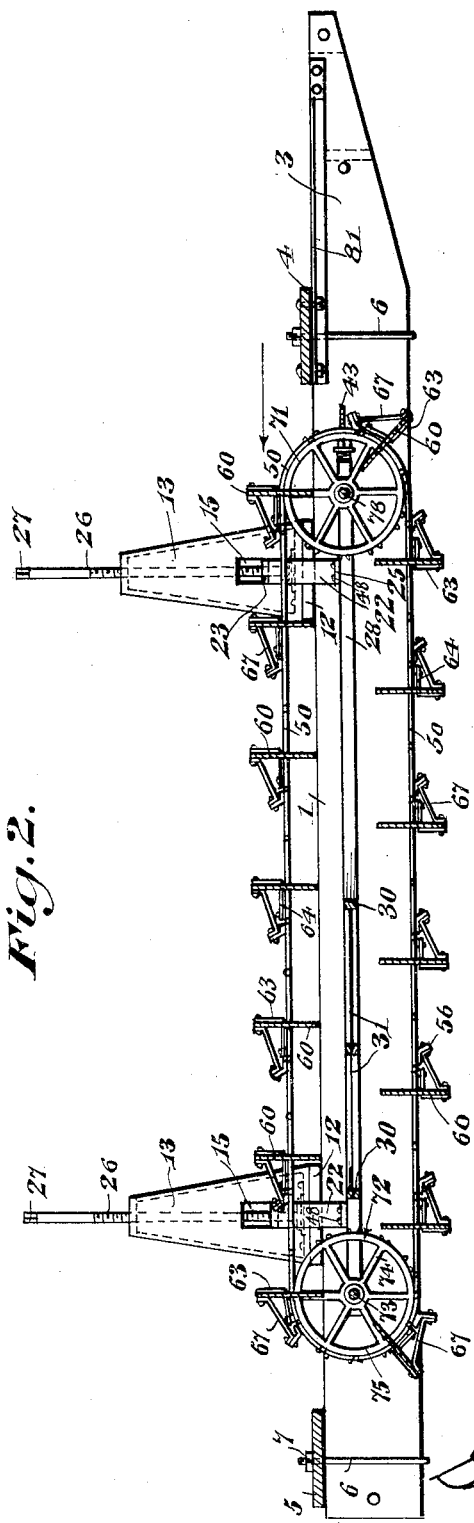
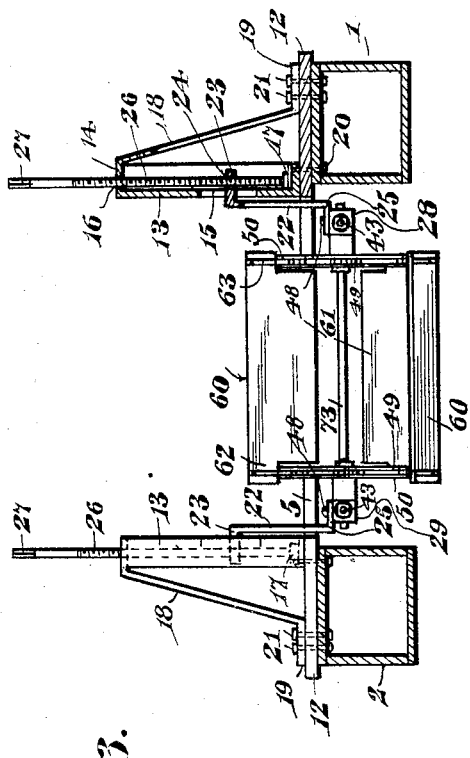

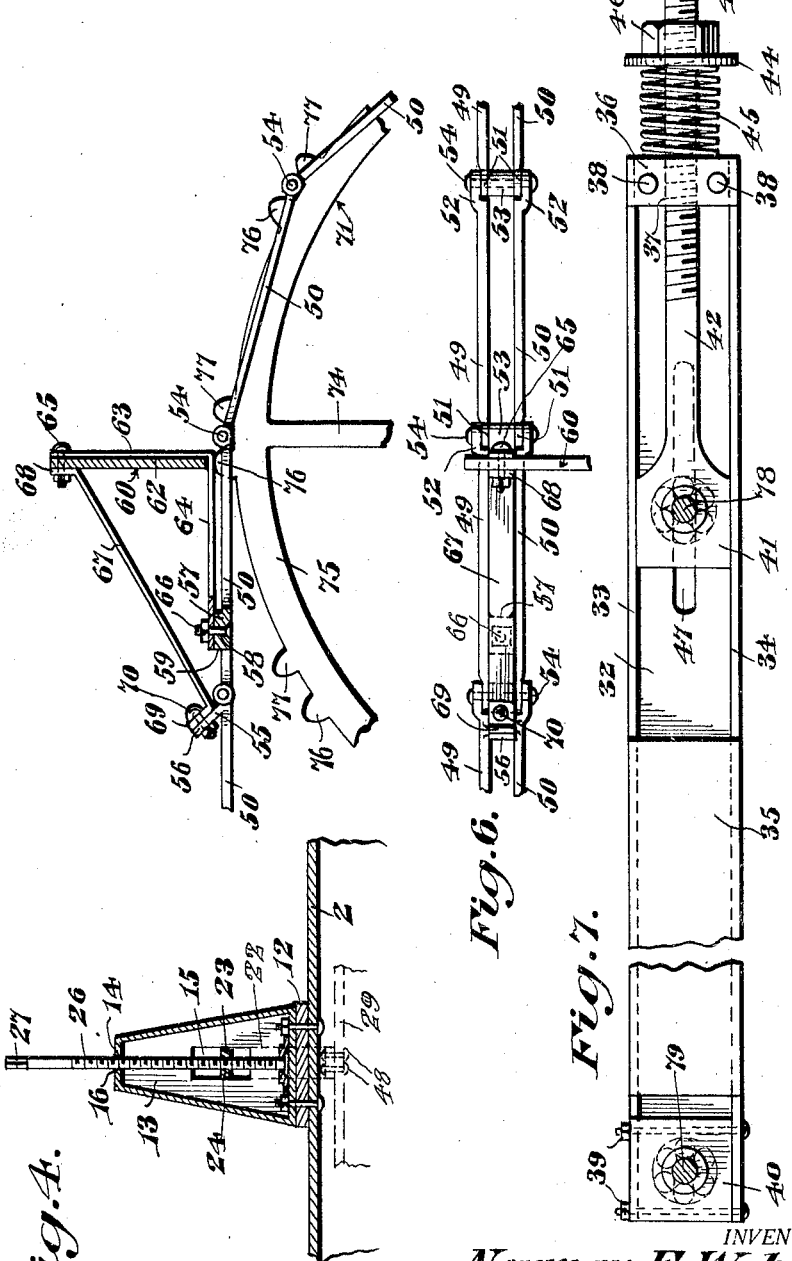

Patented Nov. 26, 1929

1,737,530

UNITED STATES PATENT OFFICE

NORMAN EARLE WEBB, OF MELBA, IDAHO

WATER-POWER DEVICE

Application filed September 28, 1927. Serial No. 222,551.

This invention relates to a current motor and has for its object to provide, in a manner as hereinafter set forth, an apparatus of such class for utilizing the force of the current or flow in rivers and streams or in flumes or in any other location where the motor may be subjected to the action of currents, and converting such force into a form for effective use in the industrial art for operating machinery or other mechanisms to be driven.

Further objects of the invention are to provide, in a manner as hereinafter set forth, a current motor of the float sustained type which is comparatively simple in its construction and arrangement, strong, durable, compact, adjustable, thoroughly efficient for the purpose intended, readily assembled, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 2 is a section on line 2—2 Figure 1.

Figure 3 is a section on line 3—3 Figure 1.

Figure 4 is a detail, in vertical section, illustrating one of the suspension devices for the support of the power transmitting and converting mechanism.

Figure 5 is a fragmentary view in sectional elevation of the power transmitting and converting mechanism.

Figure 6 is a fragmentary view in plan of the power transmitting and converting mechanism.

Figure 7 is a fragmentary view in side elevation of the support for the power transmitting and converting mechanism and further illustrating one of the tensioning devices for such mechanism.

Figure 1:
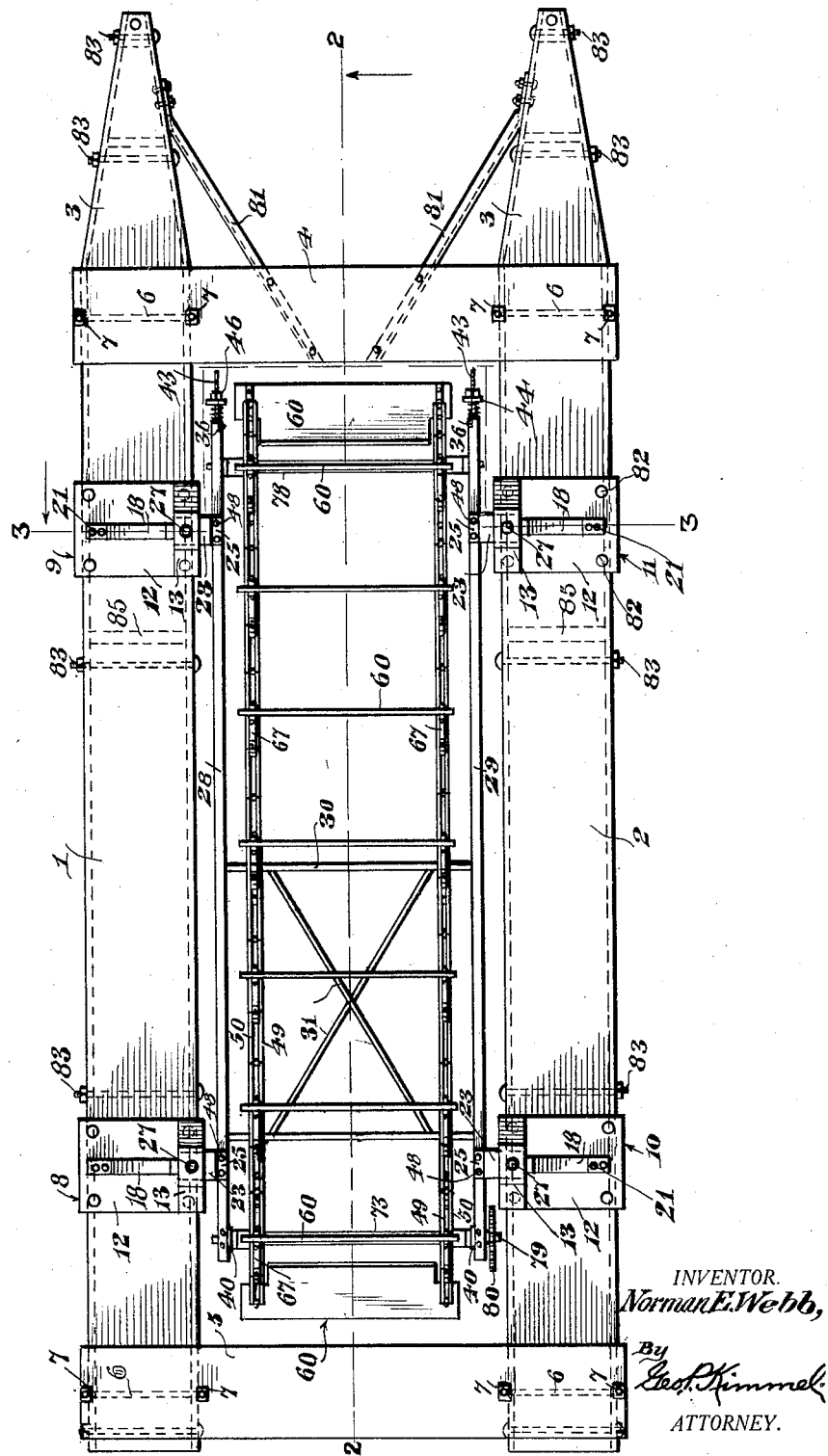
Figure 1 is a top plan view of a current motor in accordance with this invention.

A current motor, in accordance with this invention, is of the float sustained type and includes a pair of spaced floats anchored by any suitable means. The floats are indicated at 1, 2, are of substantial length, are arranged in parallelism and suitably spaced from each other. The end terminal portions of the floats 1, 2, at the intake end of the motor are tapered as indicated at 3. The floats 1, 2 can be constructed in any suitable manner and as illustrated, by way of example, they are hollow and of polygonal cross section as clearly shown in Figure 3. The floats 1, 2 in proximity to the tapered end portions 3 thereof are connected together by a flat floor member 4 and the floats at their other ends are connected together by a flat floor member 5. The members 4, 5 are in the form of planks of substantial width and are seated on the tops of the floats. The members 4, 5 are fixedly secured to the floats by yokes 6 carrying securing nuts 7 which abut against the members 4, 5 and these latter not only connect the floats 1, 2 together but maintain them in spaced relation.

Secured to each float is a pair of spaced, adjustable suspension devices for the support of the combined power transmitting and converting mechanism. The pair of suspension devices carried by the float 1 are indicated at 8, 9 and the pair carried by the float 2 are indicated at 10, 11. The suspension devices are positioned between the transverse median of the floats and the ends thereof. As the suspension devices are of like construction, but one will be described, as the description of one will apply to the other. The suspension devices carried by the float 1 are oppositely disposed with respect to the suspension devices carried by the float 2. Each of said suspension devices includes a base plate 12 of a length greater than the width of a float and the plate 12 projects inwardly and outwardly with respect to the float. Positioned upon the plate 12, at the inner end thereof, is a vertically disposed, tapered, continuously flanged support 13 and the continuous flange 14 thereof is directed outwardly. The support 13 is formed with a vertically disposed rectangular slot 15 and the slot is disposed at the vertical median of the support 13. The top of the flange 14 is formed with an opening 16 and secured to the upper face of the bottom of the flange 14, centrally thereof, is a flanged, apertured keeper 17 for the purpose to be presently referred to. Associated with the support 13 is an inclined brace member 18 which extends from the top of the flange 14 to the plate 12 and has its lower end formed with a flange 19 which seats on the plate 12. The brace 18 can be connected in any suitable manner to the top of the flange 14, but as shown said brace 18 is formed integral with said top. Holdfast devices extend through the bottom of the flange 14, plate 12 and top of a float for fixedly securing the support 13, plate 12 and float together. Holdfast devices 21 extend through the flange 19, plate 12 and top of a float for fixedly securing the base 18, plate 12 and float together. See Figure 3. Depending from the support 13 is a suspension arm 22, having its upper end provided with a right angularly disposed outwardly extending projection 23, having a vertical opening 24 with the wall thereof threaded. The lower end of the arm 23 is formed with an inwardly disposed, right angularly projecting extension 25. The projection 23 extends through the slot 15 and threadedly engages with an adjusting screw 26 for the arm 22. The screw 26 extends down through the opening 16 and has a head at its lower end swivelled to the bottom of the flange 14 by the keeper 17. The upper end of the screw 26 is of polygonal contour, as indicated at 27 to receive a suitable tool for rotating it to provide for the vertical adjustment of the suspension arm 22.

The combined power transmitting and converting mechanism is arranged between and spaced from the floats 1, 2 and preferably is of a length less than the length of said floats. The said mechanism has its ends positioned inwardly with respect to the ends of the floats. The mechanism includes a vertically adjustable supporting frame carried by the suspension arms 22 and said frame includes a pair of side members 28, 29 which are secured together and maintained in spaced relation by cross members 30 having secured therewith and arranged therebetween oppositely disposed brace members 31. The cross members 30 are secured to the side members 28, 29 in any suitable manner and preferably to the inner sides of said members 28, 29. As the side member 28, is constructed similar to the said member 29, but one will be described, as the description of one will apply to the other. Each side member of the supporting frame is of channel shaped transverse section and open at its inner side for a portion of its length. Each side member includes an outer side wall 32, a top wall 33 and a bottom wall 34. The inner side of each of said members, for a portion of its length, is closed by a wall forming member 35 of appropriate length and having its ends terminating a substantial distance inwardly with respect to the ends of the wall members 32, 33 and 34.

Secured to that end of each side member arranged in proximity to the intake end of the motor, extending into the channel formed by such member and abutting against the inner side edges of the walls 33, 34 and against the inner face of the wall 32 is a flanged casting 36 formed with an opening 37. See Figure 7. Holdfast devices 38 are provided for securing the casting 36 to a side member. Secured in the other end of the side member, by holdfast devices 39 is a bearing element 40 and which is stationary. Slidably mounted in the channel formed by a side member is an adjustable bearing 41 formed with a shank 42, disposed lengthwise with respect to the side member and formed with peripheral threads 43. The shank 42 extends through the casting 36 and is of substantial length. Mounted on the shank 42, exteriorly of the casting 36, is a washer or disc 44, and surrounding the shank 42 and interposed between the casing 36 and disc 44 is a tensioning or cushioning spring 45. Adjustably mounted on the threaded portion 43 of the shank 42 and bearing against the disc 44 is a nut 46 for increasing and decreasing the tension of the spring 45. The wall 32 of each side member is provided with a longitudinally extending slot 47 for a purpose to be presently referred to.

The support, which forms an element of the combined power transmitting and converting mechanism is fixedly secured to the extensions 25 of the arms 22 by the holdfast devices 48 and said extensions 25 are mounted on the tops of the side members 28, 29 of the support in proximity to the ends of the latter.

The combined power transmitting and converting mechanism further includes a pair of endless carriers arranged in spaced relation and having connected therewith a set of paddles arranged in spaced relation and constructed in a manner to extend between and project from carriers. As each carrier is of the same construction, but one will be described, as the description of one applies to the other. Each carrier is in the form of an endless chain formed of a series of pivotally connected links. Each link is formed of a pair of bars 49, 50 arranged in parallelism and with each bar formed with a reduced leading end 51 and a laterally offset follower end 52. The follower ends of each pair of bars are oppositely disposed with respect to each other and the leading ends of one pair of bars are positioned within the offset follower ends of an adjacent pair of bars. Arranged between the leading ends of the pair of bars is a spacing collar 53. The leading ends 51 of the bars of one link are pivotally connected to the offset follower ends of the bars of an adjacent link by a pivot bolt 54 and which extends through a spacing collar 53. Certain of the links have the bars 49, 50 in proximity to the follower ends thereof formed with an inclined lug 55 projecting outwardly from the bars and formed integral with both of them, and the lug 55 is apertured as at 56. The links which are pivoted to those links provided with the inclined lugs 55 have the bars 49, 50 thereof connected together by an arm 57 which is of a thickness to project outwardly from the bars and said arm 57 is apertured as at 58 and has its outer face shaped to form a seat 59 for a purpose to be presently referred to. The preferable arrangement with respect to the links is that every third link is provided with an arm 57 and that link arranged forwardly of and pivotally connected to the link provided with the arm 57 is formed with a lug 55. The lugs 55 and arms 57 are employed in connection with bracing means for the paddles and which will be presently referred to and said bracing means acts to maintain the paddles stationary and outwardly at right angles with respect to that link from which the paddle extends.

The paddles or blades are referred to generally by the reference character 60 and are formed with an inner rectangular portion 61 and an outer rectangular portion 62 and with the latter of greater length, but of less width than the portion 61. The portion 62 is arranged over and projects from the carriers and the portion 61 is arranged between the carriers. Associated with each paddle or blade is a pair of brace members and which are not only connected to the paddles but also the carriers. Each of said brace members includes a vertically disposed arm 63 and a horizontally disposed arm 64. The arm 63 is positioned against the follower face of the portion 62 of a paddle and is secured to the paddle by a holdfast device 65. The arm 64 extends under the portion 62 of a paddle and merges into the lower end of the arm 63. The arm 64 is mounted on the seat 59 and is secured to the arm 57 by the holdfast device 66. See Figure 5. Associated with each paddle or blade 60 is a pair of inclined brace members which are connected to the portion 62 of a paddle and also to the lug 55 of a pair of links. With reference to Figure 5 the brace member is indicated at 67, is flanged at its upper end as at 68 and at its lower end as at 69. The flange 68 abuts against the leading face of the blade or paddle and is fixedly secured therewith by the holdfast devices 65. The flange 69 abuts against the upper face of the lug 55 and is fixedly secured thereto by a holdfast device 70. The flanges 68 and 69 are provided with openings for the passage of the holdfast devices 65, 70 respectively. The holdfast devices 70 pass through the openings 56 in the lugs 55. The arrangement of bracing means, as well as coupling means for the blades or paddles maintains these latter stationary and at right angles with respect to the carriers. The power transmitting and converting mechanism further includes a pair of guide wheels and a pair of combined guide and power transmitting wheels. The wheels of the pair of guide wheels are indicated at 71 and the wheels of the combined guide and power transmitting wheels are indicated at 72. The wheels 71 and 72 are constructed alike and each of said wheels consists of a hub 73, a series of spokes integral with the hub 73 and a rim 74 integral with the hub 73. The outer edge of the rim 75 is formed with spaced pairs of teeth and the teeth of each pair are indicated at 76, 77 and arranged in spaced relation. The teeth of each pair are rounded. During the travel of the carriers the spacing collars 53 engage between a pair of teeth and the teeth of each pair engage between the bars of two adjacent links. See Figure 5. The wheels 71 are fixed to a shaft 78 which is journaled in a pair of opposed bearings 41 and said shaft 78 extends through the slot 47, and the latter in connection with the threaded shank 42, provides means, when said shank 42, is adjusted, to take up the slack in the carriers. The wheels 72 are fixed to a transmission shaft 79, which is driven from the wheels 72 and said shaft 79 extends through stationary bearings 40 and also projects from the side members 28, 29 of the support of the combined power transmitting and converting mechanism. One end of the shaft 79 carries a gear wheel 80 for connection with a power transmitting connection, not shown, for driving purposes.

Inclined braces 81 are secured to the member 4 and to the tapered ends 3 of the floats 1, 2. Holdfast devices 82 are also employed for securing the base plates 12 to the floats 1, 2. Holdfast devices 83 are employed for tying the sections of each float together and each float has arranged therein bracing means 85 disposed transversely thereof.

When the apparatus is mounted in a river, stream or in the path of a flume, the current of the water acting against the paddles will provide for the travel of the carriers and these acting on the wheels 72 will convert power derived from the current into rotary motion and the rotary force will be transmitted through the gear 80 to the points desired. The position of the combined power transmitting and converting mechanism can be adjusted with respect to the depth thereof and the water or stream by the suspension devices.

It is thought the many advantages of a current motor, in accordance with this invention, can be readily understood, and although the preferred embodiment of the invention is as illustrated and described, yet it is to be understood that changes in the details of construction can be had which fall within the scope of the invention as claimed.

What I claim is:

1. In a current motor, a pair of carriers each including arms and lugs, the arms being arranged in proximity to the lugs, current shifting paddles projecting from the carriers and adapted to operate the same, a pair of angle shaped braces secured to and extended from each paddle and anchored to a pair of arms, and a pair of inclined braces secured to each paddle and anchored to a pair of lugs.

2. In a current motor, a pair of carriers each including arms and lugs, the arms being arranged in proximity to the lugs, current shifting paddles projecting from the carriers and adapted to operate the same, a pair of angle shaped braces secured to and extended from each paddle and anchored to a pair of arms, and a pair of inclined braces secured to each paddle and anchored to a pair of lugs, said paddles having portions above and below the carriers, and said angle shaped braces each having a part thereof disposed transversely of one face of a paddle and its remaining part extending under one of said above portions and directed towards an arm, and said inclined braces arranged over said remaining parts of said angle shaped braces.

In testimony whereof, I affix my signature hereto.

NORMAN EARLE WEBB.